(12) United States Patent
Abe

(10) Patent No.: US 6,947,638 B2
(45) Date of Patent: Sep. 20, 2005

(54) OPTICAL MULTIPLEXER/DEMULTIPLEXER AND MANUFACTURING METHOD THEREOF AND OPTICAL MULTIPLEXING/ DEMULTIPLEXING MODULE

(75) Inventor: Munemitsu Abe, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 272 days.

(21) Appl. No.: 10/295,547

(22) Filed: Nov. 14, 2002

(65) Prior Publication Data
US 2003/0108292 A1 Jun. 12, 2003

(30) Foreign Application Priority Data
Dec. 12, 2001 (JP) .......................... 2001-379185

(51) Int. Cl.⁷ .................................................. G02B 6/34
(52) U.S. Cl. ............................. 385/37; 385/14; 398/79; 398/84; 398/87
(58) Field of Search .............................. 385/37, 14, 52, 385/31, 33; 398/79, 82, 84, 87, 88

(56) References Cited

U.S. PATENT DOCUMENTS

| 6,373,606 B1 | 4/2002 | Nakama |
| 6,731,838 B1 * | 5/2004 | Dueck et al. .................. 385/37 |
| 2002/0154855 A1 * | 10/2002 | Rose et al. .................... 385/24 |

* cited by examiner

*Primary Examiner*—Diane I. Lee
*Assistant Examiner*—Lisa M. Caputo
(74) *Attorney, Agent, or Firm*—Beyer Weaver & Thomas, LLP

(57) ABSTRACT

At one side of a substrate, a vertical diffraction grating is formed integrated with the substrate, at the other side of the substrate, one pair or more of fibers are disposed through which either light goes from the vertical diffraction grating or light comes into the vertical diffraction grating, and a lens member is disposed between the fibers and the vertical diffraction grating. At the other side of the substrate, positioning means which positions a plurality of fibers is formed integrated with the substrate, and a space between the vertical diffraction grating and the fibers constitutes a waveguide.

12 Claims, 9 Drawing Sheets

OPTICAL MULTIPLEXER/DEMULTIPLEXER AND MANUFACTURING METHOD THEREOF AND OPTICAL MULTIPLEXING/DEMULTIPLEXING MODULE

BACKGROUND OF THE INVENTION

1. Field of the Invention

The present invention relates to an optical multiplexer/demultiplexer to be used for an optical multiplexer/demultiplexer, etc. of an optical communication device and manufacturing method thereof.

2. Description of the Related Art

Conventionally, in optical multiplexers/demultiplexers of this kind, research has been carried out on a dielectric-filter type multiplexer/demultiplexer having a multi-layer structure in which a plurality of half-mirror type dielectric-filters are disposed, a multiplexer/demultiplexer having a structure called FBG (Fiber Bragg Grating) constituted by connecting many optical fibers with a grating structure, a multiplexer/demultiplexer having a bulk diffraction grating structure constituted by connecting a bulk-state diffraction grating to a plurality of optical fibers, and a structure called AWD (Arrayed Waveguide Grating) which is constituted by incorporating a light waveguide structure in the middle of an optical fiber.

However, there has been a problem in that optical multiplexers/demultiplexers of dielectric-filter type have a limitation of achieving multi-channel signal, and thus the cost increases with the increase of the number of channels. Also, in optical multiplexers/demultiplexers with the FBG structure, there has been a problem in that a high-cost part called circulator becomes necessary. Further, in the structure in which bulk diffraction grating is connected, there has been a problem in that the reliability in optical connection might cause a problem, and that assembling elements is difficult. Furthermore, in the case of the AWD structure, there has been a problem in that an insertion loss is large, temperature dependency might arise in the elements, thus temperature control is necessary, and a peltier device is necessary for cooling.

From the above background, various researches and developments are underway in optical multiplexers/demultiplexers. However, the above dielectric-filter type, the FBG structure type, and the AWD structure type have difficult problems to solve in that they are high cost and an insertion loss is big. Thus the present inventor focuses attention on an optical multiplexer/demultiplexer using a diffraction grating.

FIG. 24 shows an example of a well-known demultiplexer using the conventional diffraction grating of this kind. The optical demultiplexer 121 consists of an input optical fiber 100, output optical fibers 101, 102, and 103, first lenses 105, 106, 107, and 108, semiconductor lasers 110, 111, 112, and 113, second lenses 115, 116, 117, and 118, and a diffraction grating 120.

In the optical demultiplexer 121 shown in FIG. 24, the above-described input optical fiber 100 and the output optical fibers 101, 102, and 103 are disposed in alignment, and an outgoing light direction of the output optical fibers 101, 102, and 103 is 180° opposite direction to an incident light direction of the input optical fiber 100.

The first lens 105 and the semiconductor laser 110 are disposed in front of the input optical fiber 100. Also, the first lens 106, the semiconductor laser 111, and the second lens 116 are disposed at the back of the outgoing light direction of the output optical fiber 101 in sequence. The first lens 107, the semiconductor laser 112, and the second lens 117 are disposed at the back of the outgoing light direction of the output optical fiber 102 in sequence. The first lens 108, the semiconductor laser 113, and the second lens 118 are disposed at the back of the outgoing light direction of the output optical fiber 103 in sequence. Then the diffraction grating 120 is disposed facing the second lenses 115 to 118.

The operation of the optical demultiplexer 121 having a structure shown in FIG. 24 will be described. First, light including the light having different three wavelengths $\lambda 1$, $\lambda 2$, and $\lambda 3$ enters from the input optical fiber 100 into the semiconductor laser 110 through the first lens 105. The incident light is amplified by the semiconductor laser 110, and enters the diffraction grating 120 through the second lens 115. Light is reflected at a different angle for each wavelength by the diffraction grating 120. Thus each of the light having wavelengths $\lambda 1$, $\lambda 2$, $\lambda 3$ is amplified by each of the corresponding semiconductor lasers 111, 112, and 113 through each of the second lenses 116, 117, and 118, respectively, passes through each of the first lenses 106, 107, and 108, and is output from each of the output optical fibers 101, 102, and 103.

The optical demultiplexer 121 having a structure shown in FIG. 24 can accommodate multiple channels, and has little limitation of cost increase because expensive parts, such as a circulator, are unnecessary. However, there has been a problem in that assembling component elements is difficult, and thus miniaturization is difficult. Specifically, a light path from the input optical fiber 100 to the diffraction grating 120 through the first lens 105 and the second lens 115, and light paths from the diffraction grating 120 to the output optical fibers 101, 102, and 103 through the second lenses 116, 117, and 118, and the first Lenses 106, 107, and 108, respectively need to be positioned exactly. Thus an assembling process including positioning each of the parts constituting the demultiplexer tends to become extremely complicated, and the demultiplexer has a structure which is difficult for mass production.

SUMMARY OF THE INVENTION

The present invention is made based on the above-described background, and it is an object of the present invention to provide an optical multiplexer/demultiplexer and an optical multiplexing/demultiplexing module in which a position relationship between the diffraction grating and the optical fibers can be determined exactly, and which can be miniaturized and is excellent for mass production.

Also, the present invention is made based on the above-described background, and it is another object of the present invention to provide a method for manufacturing an optical multiplexer/demultiplexer and an optical multiplexing module in which a position relationship between the diffraction grating and the optical fibers can be determined exactly, and which can be miniaturized and is excellent for mass production.

According to a first aspect of the present invention, there is provided an optical multiplexer/demultiplexer in which a vertical diffraction grating is formed at one side of a substrate integrated with the substrate, one pair or more of fibers through which light goes out from the vertical diffraction grating or light comes into the vertical diffraction grating are disposed at the other side of the substrate, a lens member is disposed between the fiber and the vertical diffraction grating, positioning means which positions a plurality of the fibers is formed at the other side of the substrate integrated with the substrate, and a space between the vertical diffraction grating and the fibers constitutes a waveguide.

The vertical diffraction grating is formed at one side of a substrate integrated with the substrate, and thus the vertical diffraction grating is positioned exactly with respect to the substrate. Also, positioning means which positions a plurality of the fibers is formed at the other side of the substrate integrated with the substrate, and thus the fibers are positioned exactly with respect to the substrate. Accordingly, the optical fibers and the vertical diffraction grating are positioned exactly.

Also, by forming the vertical diffraction grating and the positioning means integrated with the substrate, assembling the parts can be simplified, and the whole optical multiplexer/demultiplexer can be miniaturized.

In an optical multiplexer/demultiplexer according to the first aspect of the present invention, the vertical diffraction grating may be formed by plating member at one side of the substrate, a plurality of positioning grooves are formed by plating member at the other side of the substrate, and each of the fibers may be positioned with respect to the vertical diffraction grating by disposing each of the fibers in each of the positioning grooves.

The vertical diffraction grating and the positioning grooves are formed by plating member on the substrate, and thus the vertical diffraction grating and the positioning grooves are formed with high precision. The fibers are placed in the positioning grooves, thus as a result of placing the fibers along the positioning grooves exactly with high precision, and thus the fibers are positioned exactly with high precision with respect to the vertical diffraction grating.

In an optical multiplexer/demultiplexer according to the first aspect of the present invention, the vertical diffraction grating may be formed by etching the substrate at one side of substrate, a plurality of positioning grooves may be formed at the other side of the substrate by etching a part of the substrate, and each of the fibers may be positioned with respect to the vertical diffraction grating by disposing each of the fibers in each of the positioning groove.

The vertical diffraction grating and the positioning grooves are formed on the substrate by cutting the substrate using etching, etc., and thus the vertical diffraction grating and the positioning grooves are formed at a predetermined position on the substrate with high precision. The fibers are placed in the positioning groves, and thus as a result of placing the fibers along the positioning grooves exactly with high precision, and thus the fibers are positioned exactly with high precision with respect to the vertical diffraction grating.

In an optical multiplexer/demultiplexer according to the first aspect of the present invention, the vertical diffraction grating may be formed by plating or etching the substrate at one side of substrate, a plurality of positioning grooves may be formed at the other side of the substrate by plating or etching a part of the substrate, and each of the fibers is placed with respect to the vertical diffraction grating by disposing each of the fibers in each of the positioning groove.

The vertical diffraction grating and the positioning grooves are formed on the substrate by etching or plating the substrate, and thus the vertical diffraction grating and the positioning grooves are formed at a predetermined position on the substrate with high precision. The fibers are placed in the positioning groves, and thus as a result of placing the fibers along the positioning grooves exactly with high precision, and thus the fibers are positioned exactly with high precision with respect to the vertical diffraction grating.

In an optical multiplexer/demultiplexer according to the first aspect of the present invention, the substrate may comprise an Si substrate, faces on which the vertical diffraction grating and positioning means of the Si substrate may bee formed are set to a (100) face or a (110) face of the Si substrate.

For a (100) face or a (110) face of the Si substrate, processing such as an exact groove process is possible by cutting the substrate, such as etching, etc., and thus the vertical diffraction grating and the positioning grooves are formed on the substrate with high precision.

In an optical multiplexer/demultiplexer according to the first aspect of the present-invention, a light reflective film may be formed on a surface of the vertical diffraction grating. By forming a light reflective film on a surface of the vertical diffraction grating, a reflectance of the vertical diffraction grating is improved, and thus light loss decreases.

In an optical multiplexer/demultiplexer according to the first aspect of the present invention, the lens member may be a lens array which comprises a plurality of lens main bodies positioned with respect to a plurality of the fibers.

When a light input has a multiple of channels, and a plurality of fibers are positioned with respect to the channels, by adopting a lens array structure, it is possible to correctly position all the lens main bodies with respect to a plurality of fibers by positioning a lens to one fiber. Thus it contributes to simplify the assembling process.

In an optical multiplexer/demultiplexer according to the first aspect of the present invention, fixing means for the lens member may be formed integrally on the substrate between the fiber and the vertical diffraction grating.

By fixing means formed integrally on the substrate, the forming position can become exact, and thus the lens member can be positioned exactly.

According to a second aspect of the present invention, there is provided an optical multiplexing/demultiplexing module in which a vertical diffraction grating is formed at one side of a substrate integrated with the substrate, one pair or more of fibers through which light goes from the vertical diffraction grating or light comes into the vertical diffraction grating are disposed at the other side of the substrate, a lens member is disposed between the fiber and the vertical diffraction grating, positioning means which positions a plurality of the diffraction grating is formed at the other side of the substrate, a space between the vertical diffraction grating and the fibers constitutes a waveguide, a casing covers the substrate, the vertical diffraction grating, the positioning means for the fiber, the lens member, and the waveguide, and a fiber joint part is formed at an end part of the fiber lead-out from the casing.

In the optical multiplexing/demultiplexing module of the present invention, the vertical diffraction grating of the optical multiplexer/demultiplexer is formed at one side of a substrate integrated with the substrate, and thus the vertical diffraction grating is positioned exactly with respect to the substrate. Also, positioning means which positions a plurality of the fibers is formed at the other side of the substrate integrated with the substrate, and thus the fibers are positioned exactly with respect to the substrate. Accordingly, the module is provided with the optical multiplexer/demultiplexer in which the optical fibers and the vertical diffraction grating are positioned exactly.

According to a third aspect of the present invention, there is provided a method of manufacturing an optical multiplexer/demultiplexer in which a vertical diffraction grating is formed at one side of a substrate integrated with the substrate, one pair or more of fibers through which light goes out from the vertical diffraction grating or light comes into the vertical diffraction grating are disposed at the other side of the substrate, a lens member is disposed between the fiber and the vertical diffraction grating, positioning means which positions a plurality of the diffraction grating is formed at the other side of the substrate, and a space between the vertical diffraction grating and the fibers constitutes a waveguide, wherein resist is applied to the substrate on which at least a surface thereof is made conductive, the resist is exposed and developed to form a pattern for forming the vertical diffraction grating, a pattern forming the fiber-positioning member, and a pattern for the lens member attaching part, and then plating processing is applied to the substrate to form the vertical diffraction grating, the lens member attaching part, and the fiber-positioning member, which are made of plating member, along each of the patterns on the substrate.

Resist is applied to the substrate and the resist is exposed and developed to form a pattern for forming the vertical diffraction grating pattern, and the fiber-positioning member and the vertical diffraction grating pattern, and the fiber-positioning member are formed by plating member based on these. Thus plating member can be formed with photo-litho pattern forming precision along the photo-litho pattern, and thus the vertical diffraction grating and the fiber-positioning member can be formed on the substrate integrally with high precision.

According to a fourth aspect of the present invention, there is provided a method of manufacturing an optical multiplexer/demultiplexer in which a vertical diffraction grating is formed at one side of a substrate integrated with the substrate, one pair or more of fibers through which light goes from the vertical diffraction grating or light comes into the vertical diffraction grating are disposed at the other side of the substrate, a lens member is disposed between the fiber and the vertical diffraction grating, positioning means which positions a plurality of the diffraction grating is formed at the other side of the substrate, and a space between the vertical diffraction grating and the fibers constitutes a waveguide, wherein resist is applied to the substrate, the resist is exposed and developed to form a pattern for forming the vertical diffraction grating, a pattern forming the fiber-positioning member, and a pattern for the lens member attaching part, and then a surface of the substrate is etched through the pattern to form the vertical diffraction grating, the lens member attaching part, and the fiber-positioning member along each of the patterns on the substrate.

Resist is applied to the substrate and the resist is exposed and developed to form a pattern for forming the vertical diffraction grating pattern, and the fiber-positioning member and the vertical diffraction grating pattern, and the fiber-positioning member are formed by etching from cutting substrate based on these. Thus cutting substrate can be formed with photo-litho-pattern forming precision along the photo-litho-pattern, and thus the vertical diffraction grating and the fiber-positioning member can be formed on the substrate integrally with high precision.

In a method for manufacturing an optical multiplexer/demultiplexer according to the fourth aspect of the present invention, the vertical diffraction grating may be formed by the above-described plating, and the fiber-positioning member may be formed by etching.

In a method for manufacturing an optical multiplexer/demultiplexer according to the fourth aspect of the present invention, the vertical diffraction grating may be formed by the above-described etching, and the fiber-positioning member may be formed by the above-described plating.

The vertical diffraction grating or the fiber-positioning member can be formed exactly on the substrate either by the plating method or the etching method.

DESCRIPTION OF THE PREFERRED EMBODIMENTS

Next, the present invention will be described in detail using the drawings. In this regard, in the following drawings, in order to clarify the structure of each part, the scale size of each part is appropriately changed to be illustrated easily.

Figure 1:
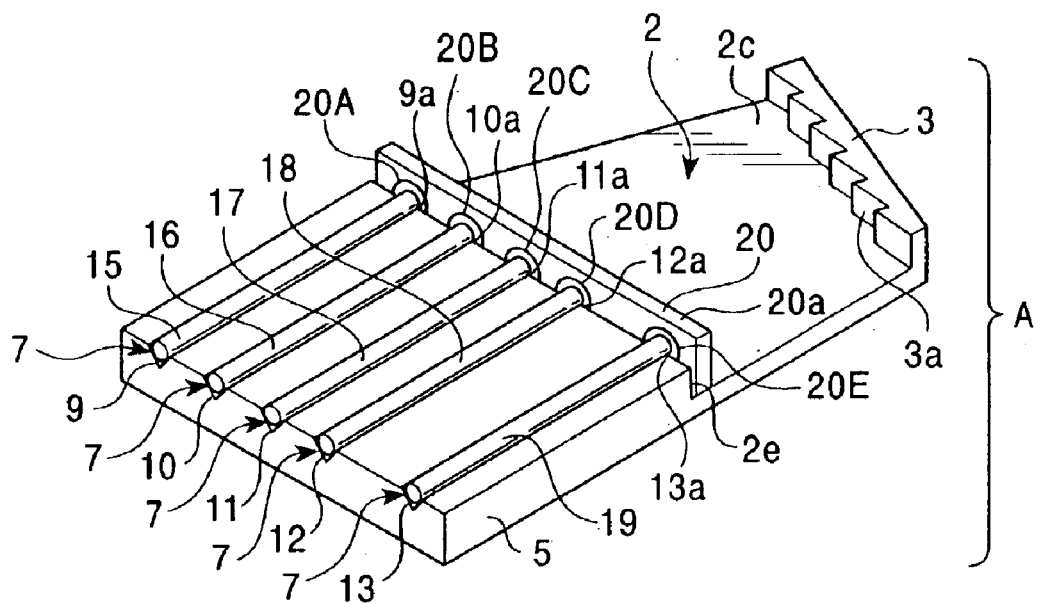
FIG. 1 is a perspective view illustrating the optical demultiplexer according to a first embodiment of the present invention.

FIG. 1 is a perspective view illustrating the four-channel type optical demultiplexer A according to a first embodiment of the present invention.

The optical demultiplexer A of this type has a basic structure in which a substrate 2 having a nearly trapezoid shape in plan view and having one side narrowed and the other side widened, a vertical diffraction grating 3 is formed at one side of the substrate 2 integrated with the substrate 2, and a fiber-positioning member 5 is formed at the other side of the substrate 2 integrated with the substrate 2.

The substrate 2 is composed of an Si substrate, a substrate processable by etching, or an Si substrate of which surface is processable by plating, an Alti substrate, and so on.

The central part of the substrate 2 is a connection part 2c which is a flat plate, the vertical diffraction grating 3 is formed at one side of the end part of the substrate 2 so as to protrude higher than the upper surface of the connection part 2c. At the connection part 2c of the vertical diffraction grating 3, a diffraction reflective face 3a having a minute triangular toothing shape is formed. In this regard, in the figure, the toothing shape of the diffraction reflective face 3a is enlarged to be visualized, however, the actual toothing shape is for the sake of diffraction/reflection of light at a different angle depending on each wavelength, and thus it is a microscopic toothing shape. Also, the diffraction reflective face 3a may be coated by a light reflective layer such as a silver coating layer in order to improve the reflective efficiency to constitute a diffraction reflective face with high reflectivity.

Next, a fiber-positioning means 7 having a V-shaped groove is formed on the upper surface of the fiber-positioning member 5. In this example, the positioning means 7 consists of five V-shaped positioning grooves 9, 10, 11, 12, and 13 formed in parallel with each other such that one end part is directed to the vertical diffraction grating 3 on the upper surface of the positioning member 5 formed to have a larger thickness than the connection part 2c of the substrate 2. Each of the end parts 9a, 10a, 11a, 12a, and 13a of the vertical diffraction grating 3 side of the positioning grooves 9 to 13 are positioned a little above the upper surface of the connection part 2c of the substrate 2.

Next, each of the output fibers 15, 16, 17, and 18 is placed in each of the positioning grooves 9, 10, 11, and 12 exactly along each of the groove bottoms, respectively, an input fiber 19 is placed in the positioning groove 13 exactly along the groove bottom, and each of them is fixed by fixing means such as adhesion. The fiber 19 is an input medium of the light including four different wavelengths, and the fibers 15, 16, 17, and 18 are output mediums of the diffracted light from the vertical diffraction grating 3.

Furthermore, a shoulder 2e is formed at the end part of the connection part 2c in the thick positioning member 5, and lens member (lens array) 20 is fixed by adhesive along the shoulder 2e. The lens member 20 has a structure in which five lens bodies 20A, 20B, 20C, 20D, and 20E are formed in alignment on one long substrate 20a. The lens body 20A is positioned with respect to the fiber 15, the lens body 20B is positioned with respect to the fiber 16, lens body 20C is positioned with respect to the fiber 17, lens body 20D is positioned with respect to the fiber 18, and lens body 20E is positioned with respect to the fiber 19.

Also, in this embodiment, a space part between the fibers 15, 16, 17, 18, and 19 and the vertical diffraction grating 3, more specifically, a space between the lens member 20 and the vertical diffraction grating 3 serves as a waveguide.

When the light including four different wavelengths $\lambda 1$, $\lambda 2$, and $\lambda 3$ enters the demultiplexer A having a structure described above from the input fiber 19, and strikes the diffraction reflective face 3a of the vertical diffraction grating 3 through the lens body 20E, the light having different wavelength is individually diffracted/reflected at a different reflection angle for each wavelength by the diffraction reflective face 3a. The light having a wavelength of $\lambda 1$ enters the fiber 15 through the lens body 20A, the light having a wavelength of $\lambda 2$ enters the fiber 16 through the lens body 20B, the light having a wavelength of $\lambda 3$ enters the fiber 17 through the lens body 20C, the light having a wavelength of $\lambda 4$ enters the fiber 18 through the lens body 20D, and through each of the fibers 15, 16, 17, and 18, the light having each wavelength can be obtained. Thus the demultiplexer A can be used as a four-channel type optical demultiplexer.

In the demultiplexer A having a structure described above, the vertical diffraction grating 3 and the positioning grooves 9 to 13 are formed integrally with respect to the substrate 2, thus a monolithic structure as the demultiplexer A is adopted, and thus miniaturization and weight saving as the demultiplexer A can be achieved. Then the diffraction/reflection angle of the incident light onto the diffraction reflective face 3a from the input fiber 19 is obtained for each wavelength in advance. By manufacturing the lens member 20 having the lens bodies 20A to 20E, which are designed to position each of the lens bodies 20A to 20E at a corresponding position depending on the reflection angle for each wavelength, if the lens member 20 is positioned correctly with respect to the substrate 2, the lens bodies 20A to 20E are individually positioned accurately. This positioning can be achieved by accurately forming the position of the shoulder 2e which is to be formed on the substrate 2 and then attaching the lens member 20 with reference to the shoulder 2e.

Also, by accurately forming the positions of the positioning grooves 9 to 13 on the substrate 2 so as to position the grooves with respect to the lens bodies 20A to 20E, the lens bodies 20A to 20E and the fibers 15 to 19 can be positioned accurately. The positioning grooves 9 to 13 are V-shaped, and thus they are preferable to accurately position the fibers 15 to 19 which have round outer shapes. However, positioning grooves 9 to 13 may have another shape such as quadrilaterals, etc.

Figure 2:
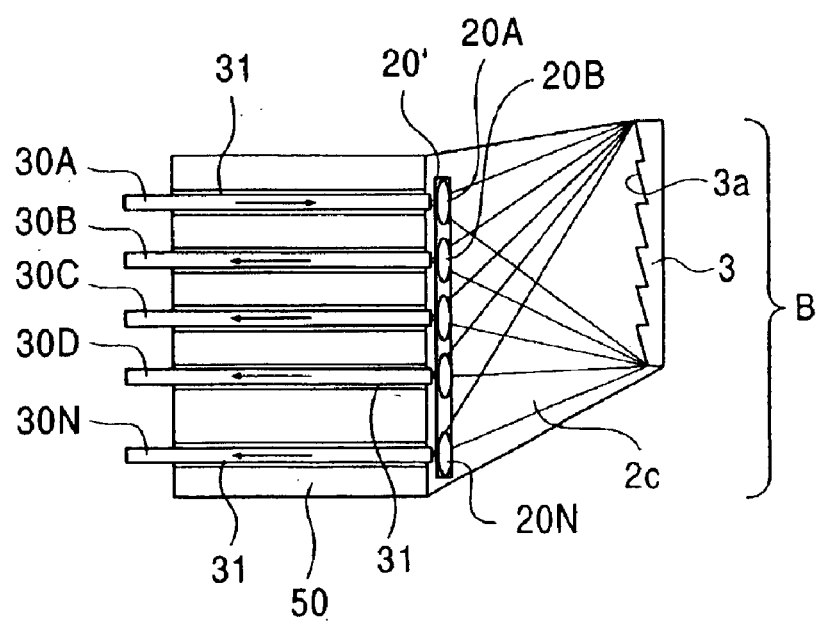
FIG. 2 is a perspective view illustrating the optical demultiplexer according to a second embodiment of the present invention.

FIG. 2 illustrates an n-channel type optical demultiplexer B according to a second embodiment of the present invention. In this embodiment, the difference from the first embodiment is that the number of output fibers 30A to N (N denotes an integer), which is identical to the necessary number of channels n (n denotes an integer), are disposed on the positioning member 50, and lens member 20' having lens bodies corresponding to the number of fibers is disposed. For the other elements of the structure, the same reference numeral is given to the same portion as in the first embodiment, and the description of these parts are omitted. Of these fibers, the fiber 30A is for input, the fibers 30B, 30C, 30D . . . 30N are for output.

In the embodiment, the same number of V-shaped positioning grooves 31 as the necessary number of channels and the positioning groove 31 for the input fiber are formed on the upper surface of the positioning member 50. The fibers 30A to 30N are placed so as to be positioned with respect to the positioning grooves 31. In FIG. 2, only four pieces of these n-channel fibers are described, and the other fibers are omitted. However, the necessary number of fibers corresponding to the number of channels may be placed.

With the above arrangement, when the light including n-channel wavelengths enters through the input fiber 30A, the light is diffracted/reflected by the vertical diffraction grating 3 at a different angle for each wavelength, and thus output light for each wavelength can be obtained from the necessary number of output fibers 30B to 30N. Therefore, the optical demultiplexer of this embodiment can be used for an n-channel type optical demultiplexer B.

Figure 3:
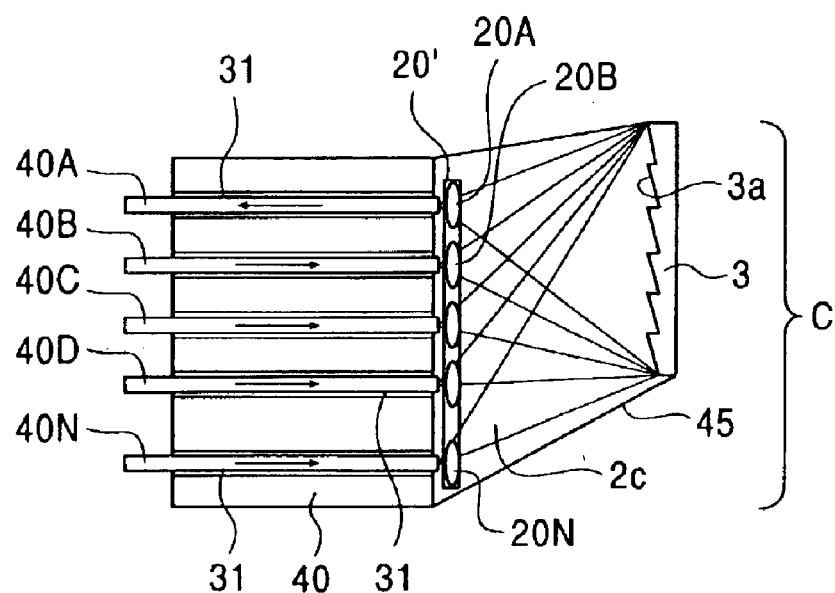
FIG. 3 is a perspective view illustrating the optical multiplexer according to a third embodiment of the present invention.

FIG. 3 illustrates the n-channel type optical multiplexer C according to a third embodiment of the present invention. In this embodiment, the difference from the first and the second embodiments is that the number of output fibers 40A to N (N denotes an integer), which is identical to the necessary number of channels n (n denotes an integer) are disposed on the positioning member 50 on the substrate 40, and lens member 20' having lens bodies corresponding to the number of fibers is disposed. Of these fibers, the fiber 40A is for output, the fibers 40B, 40C, 40D to 40N are for input.

For the other elements of the structure, the same reference numeral is given to the same portion as in the first embodiment, and the description of these parts are omitted. In the embodiment, the same number of V-shaped positioning grooves 31 as the necessary number of channels and the positioning groove 31 for the output fiber are formed on the upper surface of the base part. The fibers 40A to 40N are placed so as to be positioned with respect to these.

With the above arrangement, when individual light through each one channel, that is, n-channel wavelength light in total, separately enters the vertical diffraction grating 3 through the input fibers 40B to 40N, the light is diffracted for each wavelength, and is synthesized to be reflected by the vertical diffraction grating 3, and thus the output light, which is synthesized from the n-channel wavelength light, can be obtained from the fiber 40A. Therefore, the optical multiplexer C of this embodiment can be used for an n-channel type optical multiplexer.

Figure 4:
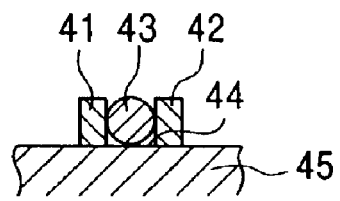
FIG. 4 is a sectional view illustrating an example of a holding convex part to be applied to holding means of the optical multiplexer according to the present invention.
Figure 5:
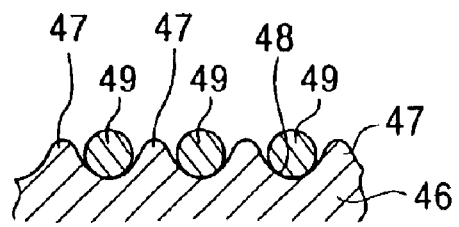
FIG. 5 is a sectional view illustrating another example of a holding convex part to be applied to holding means of the optical multiplexer according to the present invention.

In this regard, in the above-described first to third embodiments, V-shaped positioning grooves are used for fiber-position holding means. However, as fiber-position holding means, as shown in FIG. 4, protruding parts 41 and 42 may be disposed at about the same interval as the diameter of a fiber 43 on a substrate 45 by plating, and the fiber 43 may be fixed by adhesive in a concave part 44 which is constituted by the protruding parts 41 and 42. Also, as shown in FIG. 5, a plurality of concavo-convex parts having a sine curve sectional view may be formed on the surface of the substrate 46, and a fiber 49 may be placed in a concave portion 48 comparted by convex parts 47, and may be fixed by adhesive.

Next, a description will be given of an example of the method for forming positioning grooves which are V-shaped in cross section in the various substrates used in the embodiments described above.

Figure 6:
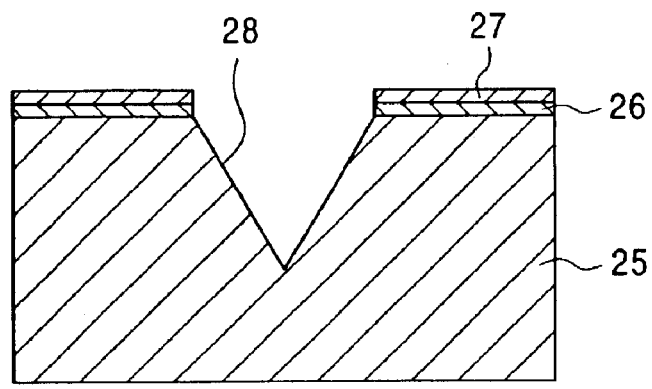
FIG. 6 is a sectional view illustrating an example of a positioning groove to be applied to holding means of the optical multiplexer according to the present invention.

In order to form positioning grooves which are V-shaped in cross section using an Si substrate, using a (100) plane directional Si substrate 25 as shown in FIG. 6, in which a (100) plane of an Si substrate is on the surface, a first etching mask 26 composed of $SiO_2$ and a second etching mask 27 composed of SiNX are laminated on a part of the surface where grooves are not formed by a film forming method such as a plasma CVD method. Then the Si substrate 25 is etched using etching solution such as KOH, etc.

Here, the etching rate of the etching masks 26 and 27 by KOH is $\frac{1}{1000}$ or less than the etching rate of the Si (100) face, and thus the part covered by these etching masks 26 and 27 are etched little if anything, and only the part which is not covered by the etching masks 26 and 27 is etched selectively. Also, because of the difference of the Si substrate etching rate in crystal orientation by KOH, a positioning groove 28, which is V-shaped in cross section as shown in FIG. 6, is formed. Accordingly, when a width of the part which is not covered by the oxide films is set to a little larger than the diameter of the fiber 15, the positioning groove 28 can be used for the positioning grooves 9 to 13, or the positioning groove 31.

Figure 7:
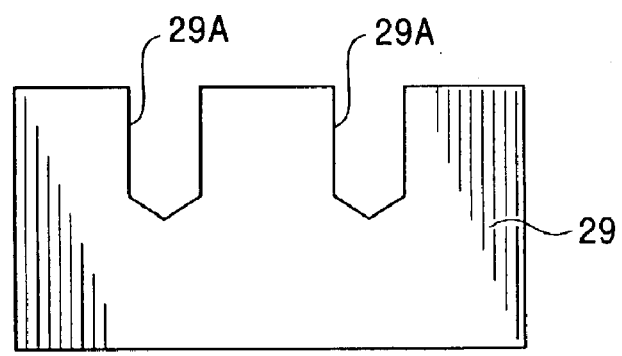
FIG. 7 is a sectional view illustrating another example of a positioning groove to be applied to holding means of the optical multiplexer according to the present invention.

Also, the positioning groove to be used in the present invention may be manufactured not only based on the Si (100) direction shown in FIG. 6, but may be manufactured using a (110) plane directional Si substrate 29 in which an Si (110) is on the surface as shown in FIG. 7. In this case, a groove shape formed by a wet etching such as KOH, etc. becomes as shown in FIG. 7. In a positioning groove 29A having a cross sectional structure shown in FIG. 7, the width of the groove is set to almost the same as that of the holding fiber, and the fiber is pressed into the groove bottom, is fixed by fixing means such as adhesive, and thus the fiber is positioned accurately.

Also, although not shown in the figure, a groove having a shape of flat bottom in FIG. 7 can also be formed by plasma etching, etc. In this case, the plane direction of the Si substrate is arbitrary.

By the methods as described above, when the positioning grooves 9 to 13 or the positioning groove 31 are formed by chemical etching using etching solution, or physical etching such as plasma etching, etc., the positioning grooves 9 to 13 or the positioning groove 31 can be formed on the substrate accurately with the accuracy of micron order or submicron order. This ensures enough accuracy for the optical multiplexer/demultiplexer which has been necessary to be positioned rigidly as ever before. Thus the positioning groove 28 or 29A capable of holding a fiber with high precision can be formed by chemical etching or physical etching.

Next, a description will be given below of an example of a method for manufacturing a four-channel type multiplexer with reference to FIGS. 8 to 14.

A method for manufacturing a multiplexer E of the embodiment having a structure shown in FIG. 12 will be described in the following based on FIGS. 8 to 14. In the multiplexer E of the embodiment, a vertical diffraction grating 51 made of plating member is formed protruding in the center of one side of the upper surface of an Si substrate 50, the diffraction/reflection face 51*a* of the vertical diffraction grating 51 is formed facing the central part of the substrate 50, an input fiber 52 is fixed by the positioning means 58 described later facing diagonally from one side toward the diffraction/reflection face 51*a* on the substrate 50, output fibers 53, 54, 55, and 56 are fixed by the positioning means 59 described later facing diagonally from the other side toward the diffraction/reflection face 51*a* on the substrate 50, and a plate lens member (lens array) 57 is fixed by the positioning means (positioning means) 75 described later is fixed to be positioned between the diffraction/reflection face 51*a* and the fibers 53, 54, 55, and 56.

Figure 13:
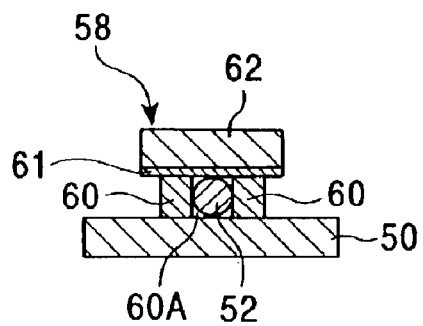
FIG. 13 is a sectional view illustrating the structure of the part in which a fiber is positioned in the optical multiplexer shown in FIG. 12.
Figure 14:
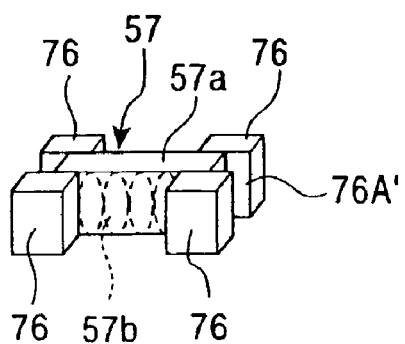
FIG. 14 is a sectional view illustrating the structure of the part in which a glass member is positioned in the optical multiplexer shown in FIG. 12.

Among this embodiment, in the positioning means 58 of the fiber 52, holding convex parts 60, 60, which are made of plating member and formed protruding at the same interval as the diameter of the fiber 52 on the substrate 50 as shown in FIG. 13, are disposed, the height of the holding convex parts 60, 60 are formed to be nearly the same as the diameter of the fiber 52, the fiber 52 is sandwiched in the positioning groove 60A between the holding convex parts 60, 60, a transparent fixing member 62 such as pyrex (registered trademark) glass (heat-resistant glass) is put on the holding convex parts 60, 60 and the fiber 52, the holding convex parts 60, 60 and the fixing member 62 are put together as a gate, and the holding convex parts 60, 60 the fiber 52, the fixing member 62 are bonded integrally, and the fiber 52 is fixed in the positioning groove 60A between the holding convex parts 60, 60 through a adhesive layer 61 which is composed of ultraviolet curing type resin, etc.

In the positioning means 59 of the fibers 53 to 56, holding convex parts 63, 64, 65, 66, and 67, which are formed by plating member and have about triangular shapes in a plan view on the substrate 50, the height of the holding convex parts 63 to 67 are formed to be nearly the same as the diameter of the fibers 53 to 56, the fibers 53 to 56 are individually inserted into the positioning means 63*a*, 64*a*, 65*a*, and 66*a* between the holding convex parts 63 to 67, furthermore a transparent fixing member 68 such as pyrex (registered trademark) glass (heat-resistant glass) is put on the holding convex parts 63 to 67, the holding convex parts 63 to 67, the fibers 53 to 56, the fixing member 68 are bonded integrally, and the fibers 53 to 56 are positioned and fixed in the positioning groove 63A to 66A between the holding convex parts 63 to 67 through a adhesive layer 69 which is composed of ultraviolet curing type resin, etc. The fibers 53 to 56, which have been positioned and fixed in the positioning grooves 63*a*, 64*a*, 65*a*, and 66*a* between the holding convex parts 63, 64, 65, 66, and 67, are disposed in a fan shape in the plan view, such that the top part is directed inward and the back part is directed outward just like opening toward the vertical diffraction grating 51.

Fixing means 75 of the lens member 57 consists of four holding convex parts 76, which are formed protruding on the substrate 50 and are made of plating member, and are positioned between the vertical diffraction grating 51 and the holding convex parts 63 to 67. Between these holding convex parts 76, a positioning groove 76A' is formed so that the two adjacent holding convex parts 76 sandwich both of the end parts of the long plate lens member 57. The lens member 57 has a structure in which four lens parts 57*b* are formed in alignment on one line on the plate glass body 57*a*. The lens member 57 has a structure such that when held between the holding convex parts 76, each lens part 57*b* is positioned with respect to each of the fibers 53 to 56, and thus the light of each wavelength diffracted/reflected from the diffraction/reflection face 51*a* of the vertical diffraction grating 51 is gathered together.

Figure 8:
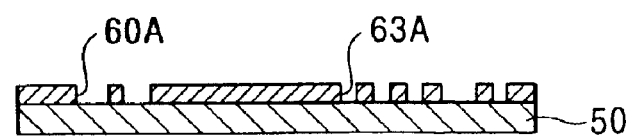
FIG. 8 is a sectional view illustrating a state in which resist is formed on a substrate in an example of a manufacturing method of the optical multiplexer according to the present invention.
Figure 9:
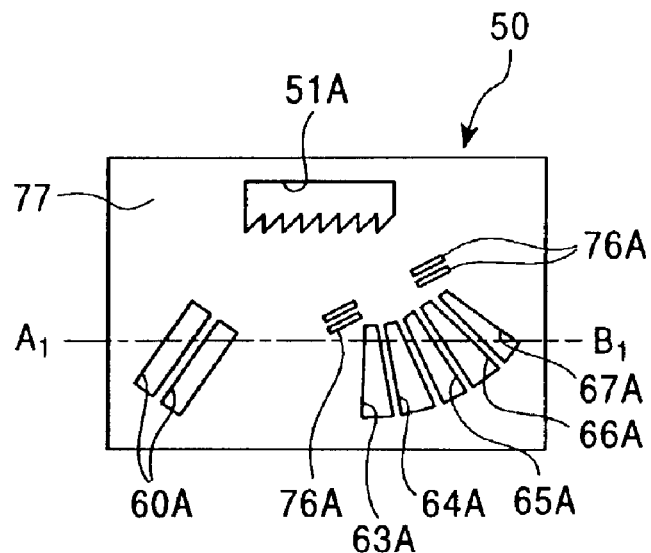
FIG. 9 is a plan view illustrating a state in which patterning is performed on the resist formed on a substrate in an example of a manufacturing method of the optical multiplexer according to the present invention.
Figure 12:
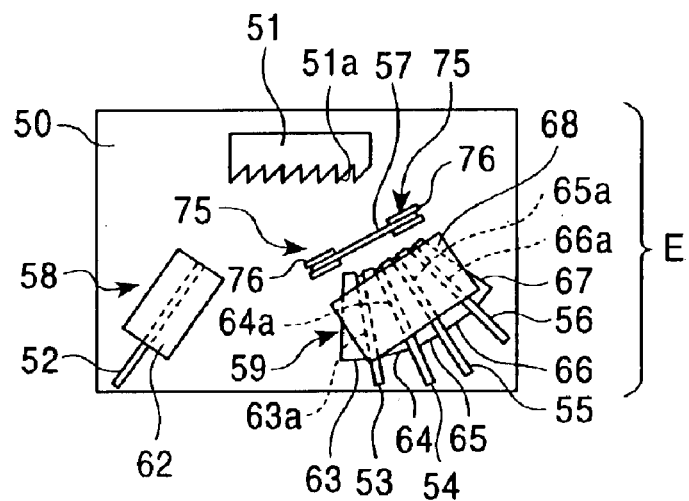
FIG. 12 is a plan view illustrating an example of the optical multiplexer obtained in an example of a manufacturing method of the optical multiplexer according to the present invention.

In order to manufacture the optical multiplexer E of the type shown in FIG. 12, the upper surface of the substrate 50 composed of Si as shown in FIG. 8 is cleaned, and a conductive thin film made of metal such as chrome is formed on all the upper surface of the substrate 50 by a film forming method, such as a sputter method and a deposition method (metal thin film is omitted in FIG. 8). After that, resist layer is applied evenly, is baked, then exposure and development are performed, and then post-baking is performed to form a flat-shape resist layer 77 shown in FIG. 9. Here, in order to form, on the resist layer 77, a final forming objects, that is, the vertical diffraction grating 51, the holding convex parts 60, 60, 63, 64, 65, 66, and 67, and the holding convex parts 76, 76, 76, 76, the flat-shape resist layer 77 is formed on which concave parts 51A, 60A, 60A, 63*a*, 64A, 65A, 66A, 67A, 67A, 76A, 76A, which are similar figures in a plan view to each of the above, have been formed.

Figure 10:
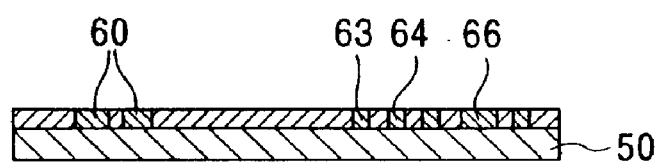
FIG. 10 is a sectional view illustrating a state in which plating is performed by the plating member on the part of the patterned resist in an example of a manufacturing method of the optical multiplexer according to the present invention.
Figure 11:
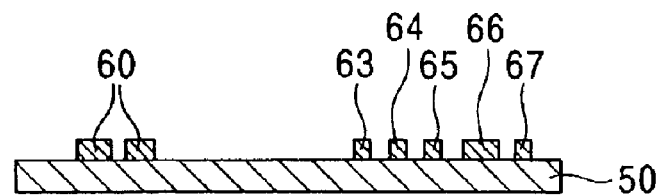
FIG. 11 is a sectional view illustrating a state in which a holding convex part and a vertical diffraction grating are formed by plating member by removing resist in an example of a manufacturing method of the optical multiplexer according to the present invention.

When the resist layer 77 is obtained, plating process is performed in order to form either an Au/Cr compound layer or an Ni/Cr compound layer, plating member is embedded in the concave part as shown in FIG. 10, and the resist layer 77 is removed by remover solution to form the vertical diffraction grating 51, the holding convex parts 60, 60, the holding convex parts 63, 64, 65, 66, and 67, and the holding convex parts 76, 76, 76, 76 on the substrate 50.

In this regard, when Au is not used for plating member in the manufacturing method, a high reflective metal layer, such as a high reflective Au layer, an Au/Cr compound layer, an Ag layer, or the like is preferably formed on the diffraction/reflection face 51*a* of the vertical diffraction grating 51 by a film forming means such as an oblique evaporation.

Next, the fiber 52 is inserted into the gap of the holding convex parts 60, 60, a fixing member 62 is laid through ultraviolet curing type adhesive layer as shown in FIG. 13, and the adhesive layer is cured by illuminating ultraviolet light to position/fix the fiber 52. Also, the fibers 53 to 56 are inserted into the gaps of the holding convex parts 63 to 67, a fixing member 68 shown in FIG. 12 is laid through ultraviolet curing type adhesive layer, and the adhesive layer is cured by illuminating ultraviolet light to position/fix the fibers 53 to 56. For these positioning/fixing, the holding convex parts 60, 60, 63 to 67 are all formed by a photo-litho process in which the resist layer 77 described above is exposed, developed, and etched. Thus the holding convex parts 60, 60, 63 to 67 can be formed at a predetermined position on the substrate 50 with the limit precision of the photo-litho process, that is, the accuracy of micron order (for example, 1 to 2 $\mu$m accuracy) or the submicron order accuracy depending on the exposure method. Accordingly, by positioning the fibers 52 and 53 to 56 with reference to these holding convex parts 60, 60, 63 to 67, the optical multiplexer E, in which the positioning precision of these fibers are high, can be obtained.

Also, the incident light from the fiber 52 can enter into the accurate position of the diffraction/reflection face 51a of the vertical diffraction grating 51 with respect to the vertical diffraction grating 51. Further, the light diffracted/reflected from the diffraction/reflection face 51a can be accurately guided and output to the fibers 53 to 56 depending on the wavelength of the diffracted/reflected light.

Next, a description will be given below of another example of a method for manufacturing a four-channel type optical multiplexer with reference to FIGS. 15 to 21.

A method for manufacturing an optical multiplexer F of the type having a structure shown in FIG. 19 will be described, in the following, based on FIGS. 15 to 21. In the optical multiplexer F of the type, a vertical diffraction grating 81 made of component material of the substrate is formed protruding in the center of one side of the upper surface of an Si substrate 80, the diffraction/reflection face 81a, which is a high reflective metal material film, is formed on the concavo-convex part formed at one face of the vertical diffraction grating 81 facing the central part of the substrate 80, an input fiber 82 is fixed by the positioning means 88 described later facing diagonally from one side toward the diffraction/reflection face 81a on the substrate 80, output fibers 83, 84, 85, and 86 are fixed by the positioning means 89 described later facing diagonally from the other side toward the diffraction/reflection face 81a on the substrate 80, and a plate lens member (lens array) 87 is placed.

Figure 20:
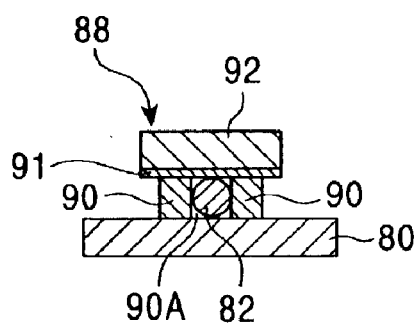
FIG. 20 is a sectional view illustrating the structure of the part in which a fiber is positioned in the optical multiplexer shown in FIG. 19.
Figure 21:
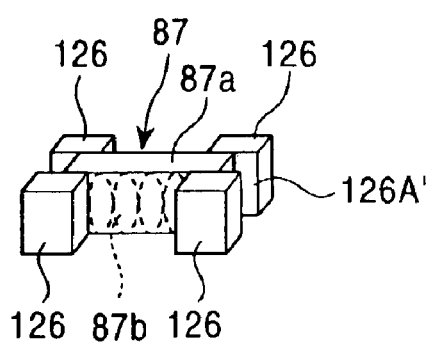
FIG. 21 is a sectional view illustrating the structure of the part in which a glass member is positioned in the optical multiplexer shown in FIG. 19.

Among this type, in the positioning means 88 of the fiber 82, holding convex parts 90, 90 which are made of plating member and formed protruding at the same interval as the diameter of the fiber 82 on the substrate 80 as shown in FIG. 20, are disposed, the height of the holding convex parts 90, 90 are formed to be nearly the same as the diameter of the fiber 82, the fiber 82 is sandwiched in the positioning groove 90A between the holding convex parts 90, 90, a transparent fixing member 92 such as pyrex (registered trademark) glass (heat-resistant glass) is put on the holding convex parts 90, 90 and the fiber 82, the holding convex parts 90, 90 and the fixing member 82 are put together as a gate, and the holding convex parts 80, the fiber 82, the fixing member 62 are bonded integrally, and the fiber 82 is fixed in the positioning groove 90A between the holding convex parts 90, 90 through a adhesive layer 91 which is composed of ultraviolet curing type resin, etc.

Figure 19:
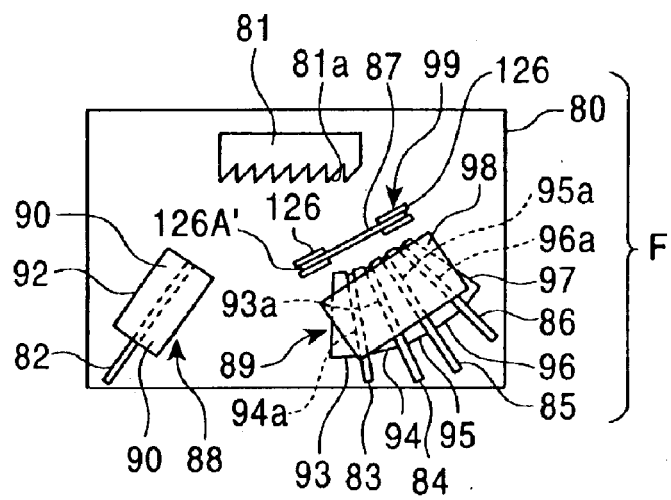
FIG. 19 is a plan view illustrating an example of the optical multiplexer obtained in an example of a manufacturing method of the optical multiplexer according to the present invention.

In the positioning means 89 of the fibers 83 to 86, holding convex parts 93, 94, 95, 96, and 97, which are formed by plating member and have about a triangular shape in a plan view on the substrate 80 as shown in FIG. 19, the height of the holding convex parts 93 to 97 are formed to be nearly the same as the diameter of the fibers 83 to 86, the fibers 83 to 86 are individually inserted into the positioning means 93a, 94a, 95a, and 96a between the holding convex parts 93 to 97, furthermore a transparent fixing member 98 such as pyrex (registered trademark) glass (heat-resistant glass) is put on the holding convex parts 93 to 97, the holding convex parts 93 to 97, the fibers 83 to 86, the fixing member 98 are bonded integrally, and the fibers 83 to 86 are positioned and fixed in the positioning groove 93a, 94a, 95a, and 96a between the holding convex parts 93 to 97 through a adhesive layer 91 which is composed of ultraviolet curing type resin, etc.

Fixing means (positioning means) 99 of the lens member 87 consists of four block-like holding convex parts 126, which is formed protruding on the substrate 80 and is made of the substrate component material, and is positioned between the vertical diffraction grating 81 and the holding convex parts 93 to 97. Between these holding convex parts 126, a positioning groove 126A' is formed so that the two adjacent holding convex parts 126 sandwich both of the end parts of the long plate lens member 87. The lens member 87 has a structure in which four lens part 87b is formed in alignment on one line on the plate glass body 87a. The lens member 87 has a structure such that when held between the holding convex parts 126, each lens part 87b is positioned with respect to each of the fibers 83 to 86, and thus the light of each wavelength diffracted/reflected from the diffraction/reflection face 81a of the vertical diffraction grating 81 is gathered together.

Figure 15:
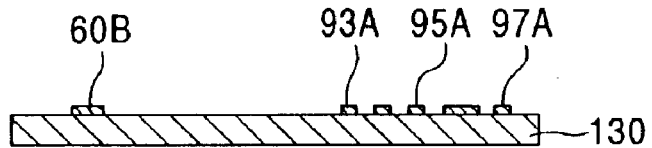
FIG. 15 is a sectional view illustrating a state in which patterning is performed on the resist formed on a substrate in an example of a manufacturing method of the optical multiplexer according to the present invention.
Figure 16:
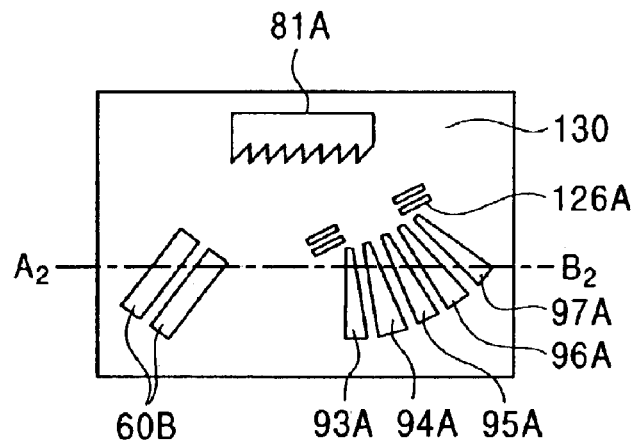
FIG. 16 is a plan view illustrating a state in which patterning is performed on the resist formed on a substrate in an example of a manufacturing method of the optical multiplexer according to the present invention.

In order to manufacture the optical multiplexer F of the embodiment shown in FIG. 19, the upper surface of the substrate 130 composed of Si as shown in FIG. 15 is cleaned, and resist layer is applied evenly on the substrate 130. After the resist layer is pre-baked, exposure and development are performed, and then post-bake is performed to form a plurality of resist layers having a sectional view shown in FIG. 15 and a plan-view shape shown in FIG. 6. Here, in order to form, on the resist layer, a final forming objects, that is, the vertical diffraction grating 81, the holding convex parts 90, 90, and the holding convex parts 126, 126, 126, 126, and the holding convex parts 93, 94, 95, 96, and 97, flat-shape convex parts 81A, 60B, 60B, 93A, 94A, 95A, 96A, 97A, 97A, 126A, 126A, 126A, and 126A, which are similar figures in a plan view to each of the above, have been formed.

Figure 17:
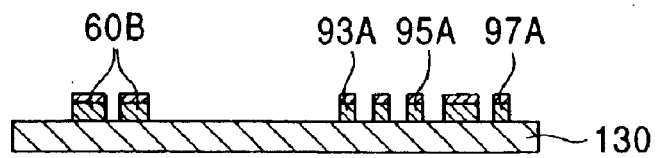
FIG. 17 is a sectional view illustrating a state in which ion beam etching is performed on a substrate through the part of the patterned resist in an example of a manufacturing method of the optical multiplexer according to the present invention.
Figure 18:
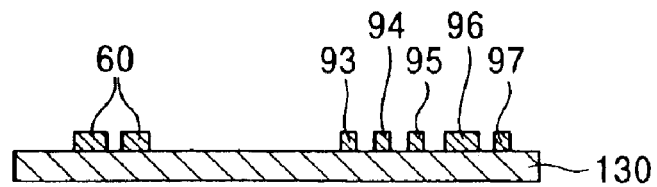
FIG. 18 is a sectional view illustrating a state in which a holding convex part and a vertical diffraction grating are formed by plating member by removing resist in an example of a manufacturing method of the optical multiplexer according to the present invention.

When the convex parts of these resist layers are obtained, dry etching process, which etches the portion of the substrate other than the convex parts, is performed, the surrounding area of the convex parts on the substrate are removed to a predetermined depth, then as shown in FIG. 17, the vertical diffraction grating 81 composed of a part of the substrate component material, the holding convex parts 60, 60, the holding convex parts 83, 84, 85, 86, and 87, and the holding convex parts 93, 94, 95, 96, and 97 are formed, and then the resist is removed. In this regard, in the manufacturing method, a metal layer such as a high reflective Au layer, an Au/Cr compound layer, an Ag layer, etc. needs to be formed on the diffraction/reflection face 81a of the vertical diffraction grating 81 by an oblique evaporation etc.

For these positioning/fixing, in the same way as the case of the structure in the previous embodiment, the holding convex parts 90, 90, 93 to 97 are all formed by a photo-litho process in which dry etching is performed through the resist layer described above. Thus the holding convex parts 90, 90, 93 to 97 can be formed at a predetermined position on the substrate 80 with the limit precision of the photo-litho process, that is, the accuracy of micron order (for example, 1 to 2 μm accuracy) or the submicron order accuracy depending on the exposure method. Accordingly, by positioning the fibers 82 and 93 to 96 with reference to these holding convex parts 90, 90, 93 to 97, the optical multiplexer F, in which the positioning precision of these fibers are high, can be obtained.

Also, the incident light from the fiber 82 can enter into the accurate position of the diffraction/reflection face 81a of the vertical diffraction grating 81 with respect to the vertical diffraction grating 81. Further, the light diffracted/reflected from the diffraction/reflection face 81a can be accurately guided and output to the fibers 93 to 96 depending on the wavelength of the diffracted/reflected light.

Figure 22:
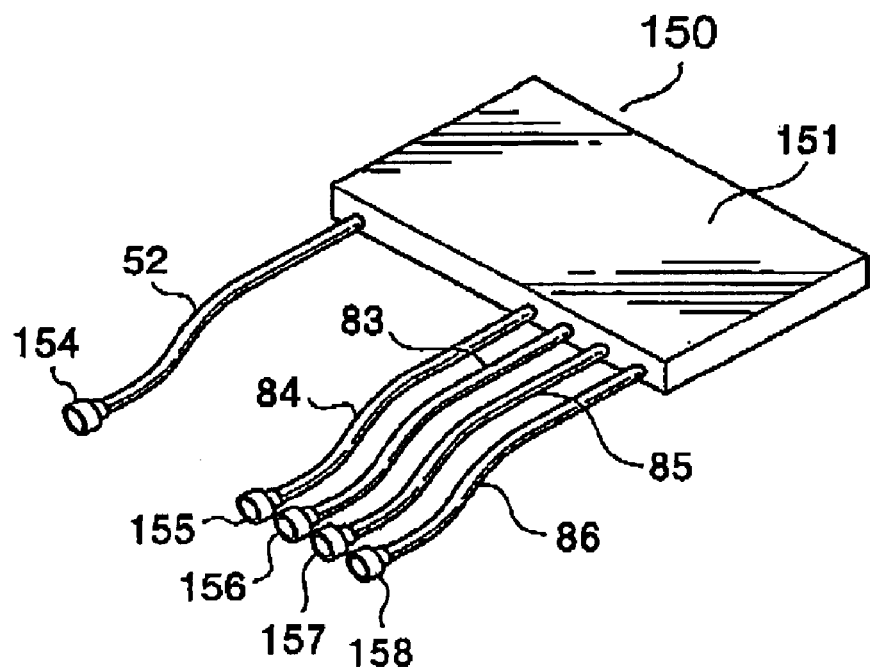
FIG. 22 is a perspective view illustrating an example of an optical multiplexing module having the optical multiplexer shown in FIG. 12.
Figure 23:
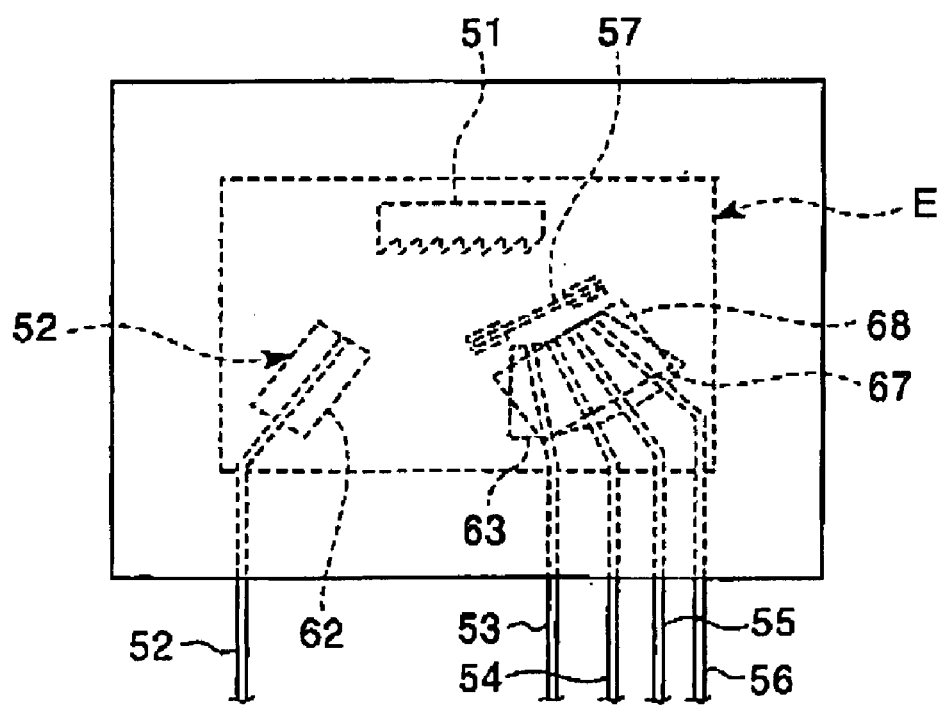
FIG. 23 is a diagram illustrating the internal structure of the same optical multiplexer.
Figure 24:
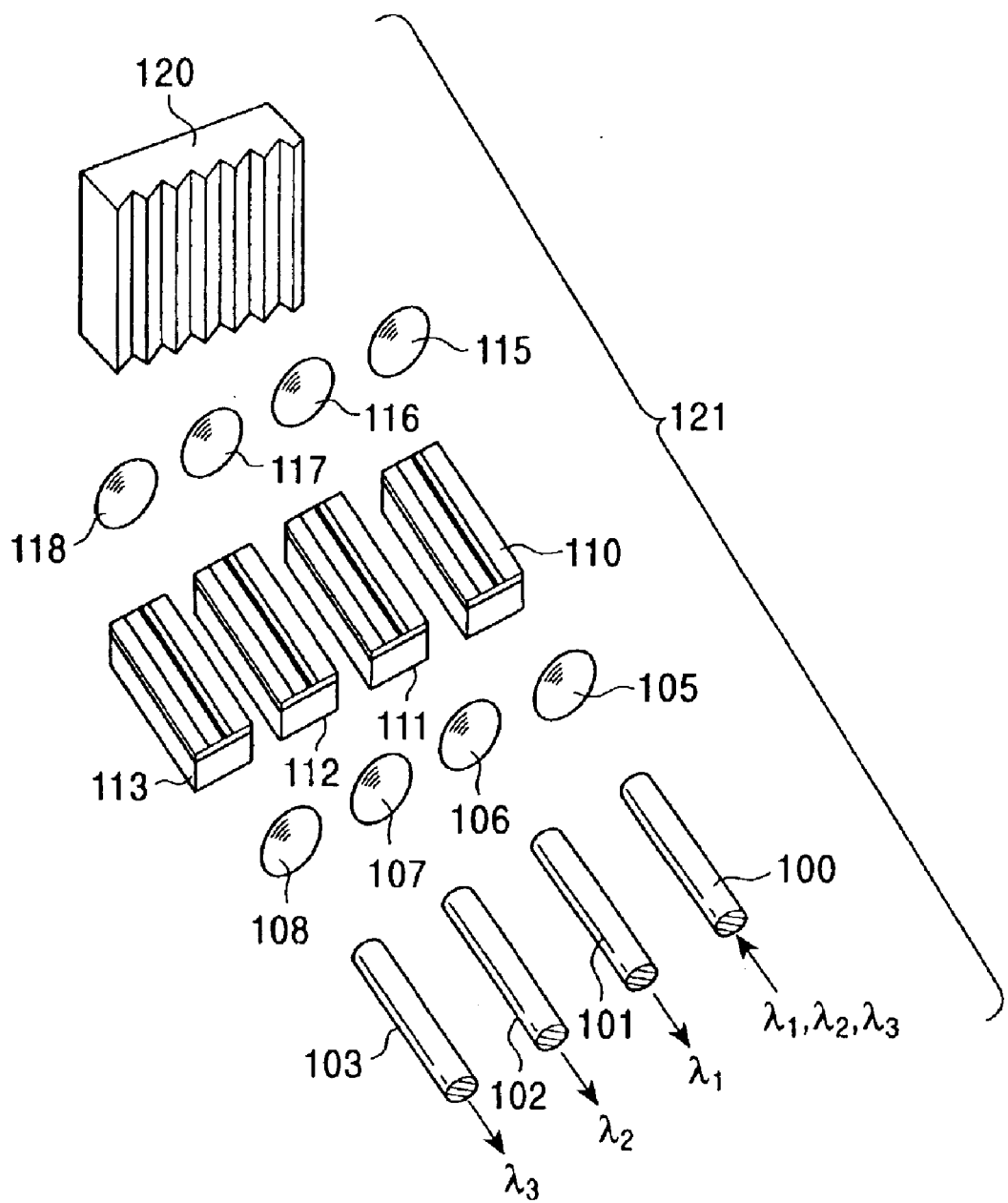
FIG. 24 is a perspective view illustrating an example of the conventional optical demultiplexer.

FIG. 22 illustrates, for example, an optical multiplexing module 150 having the optical multiplexer E shown in FIG. 12. The optical multiplexing module 150 of the example has a structure in which the optical multiplexer E disposed inside is covered with a casing (chassis) 151, the input fiber 52 is lead outside of the casing 151, an optical connector is attached to the end part of the fiber 52, the output fibers 83, 84, 85, and 86 are lead outside of the casing 151, and fiber-joint part (optical connector) 155, 156, 157, and 158 are disposed at the end parts of the fibers 83 to 86.

With this arrangement, the optical multiplexing module 150 having the characteristics possessed by the optical multiplexer E can be provided.

In this regard, if the optical demultiplexer F described in the embodiment is disposed in place of the optical multiplexer E, an optical demultiplexing module can be made. Accordingly, the optical multiplexing module or the optical demultiplexing module can be provided by installing the optical multiplexer E or the optical demultiplexer F in the casing 151. Of course, an optical multiplexer/demultiplexer can be made by installing both the optical multiplexer E and the optical demultiplexer-F in the casing, and providing a fiber joint part individually.

In this regard, in the manufacturing method described thus far, a description has been given of the case where the vertical diffraction grating and the holding convex parts are manufactured by only a plating method or an etching method. However, combination of both methods can be adopted as a matter of course. Specifically, the vertical diffraction grating may be formed by the plating method, the holding convex parts may be formed by the etching method, or the vertical diffraction grating may be formed by the etching method, the holding convex parts may be formed by the plating method, or the vertical diffraction grating and a part of the holding convex parts may be formed by the etching method, and the rest may be formed by the plating method.

As described above, the vertical diffraction grating is formed at one side of a substrate integrated with the substrate, and thus the vertical diffraction grating is positioned exactly with respect to the substrate. Also, positioning means which positions a plurality of the fibers is formed at the other side of the substrate integrated with the substrate, and thus the fibers are positioned exactly with respect to the substrate. Accordingly, the optical fibers and the vertical diffraction grating are positioned exactly. Also, the vertical diffraction grating and the positioning means are integrated with the substrate, and thus as compared with the conventional structure in which the vertical diffraction grating and the positioning means are separate members, an assembly of the vertical diffraction grating including minute positioning and an overall assembly including the vertical diffraction grating and the positioning means can be simplified, and miniaturization of the overall optical multiplexer/demultiplexer can be achieved.

In the present invention, the vertical diffraction grating and the positioning grooves are formed on the substrate by etching or plating the substrate, and thus the vertical diffraction grating and the positioning grooves are formed at a predetermined position on the substrate with high precision. The fibers are placed in the positioning groves, thus as a result of placing the fibers along the positioning grooves exactly with high precision, and thus an optical multiplexer/demultiplexer, in which the fibers are positioned exactly with high precision with respect to the vertical diffraction grating, can be provided.

In the present invention, when a (100) face or a (110) face of the Si substrate is used for the upper surface of the substrate, processing such as an exact groove process is possible by cutting the substrate, such as etching, etc., and thus the vertical diffraction grating and the positioning grooves are formed on the substrate with high precision. In the present invention, by forming a light reflective film on a surface of the vertical diffraction grating, a reflectance of the vertical diffraction grating is improved, and thus light loss decreases as an optical multiplexer/demultiplexer.

In the present invention, when a light input has a multiple of channels, and a plurality of fibers are positioned with respect to the channels, by adopting a lens array structure, it is possible to correctly position all the lens main bodies with respect to a plurality of fibers by positioning a lens to one fiber. Thus it contributes to simplify the assembling process.

In the present invention, when fixing means of a lens member is formed on the substrate integrally, the forming position can be accurate, and thus the lens member can be positioned accurately and easily.

In the present invention, resist is applied to the substrate and the resist is exposed and developed to form a pattern for forming the vertical diffraction grating and the fiber-positioning member, thus the vertical diffraction grating and the fiber-positioning member are formed by plating member based on these. Therefore plating member can be formed with photo-litho-pattern forming precision along the photo-litho-pattern, and thus the vertical diffraction grating and the fiber-positioning member can be formed on the substrate integrally with high precision.

According to the present invention, resist is applied to the substrate and the resist is exposed and developed to form a pattern for forming the vertical diffraction grating pattern and the fiber-positioning member. The vertical diffraction grating pattern and the fiber-positioning member are formed by etching the substrate based on these. Thus cutting substrate can be formed with photo-litho pattern forming precision along the photo-litho pattern, for example, with the accuracy of micron order, and thus the vertical diffraction grating and the fiber-positioning member can be formed on the substrate integrally with high precision.

Also, according to the present invention, the vertical diffraction grating or the fiber-positioning member can be formed accurately on the substrate either by etching or by plating.

What is claimed is:

1. An optical multiplexer/demultiplexer comprising:
   a vertical diffraction grating formed on a substrate integrated with the substrate; and
   one pair or more of fibers through which light goes out from the vertical diffraction grating or light comes into the vertical diffraction grating, the one pair or more of fibers being disposed on the substrate,
   wherein a lens member is disposed between the fiber and the vertical diffraction grating,
   positioning means which positions a plurality of the fibers is formed on the substrate integrated with the substrate,
   a space between the vertical diffraction grating and the fibers constitutes a waveguide, and
   a plurality of positioning grooves are formed on the substrate by plating or etching a part of the substrate, and each of the fibers is placed with respect to the vertical diffraction grating by disposing each of the fibers in each of the positioning groove.

2. An optical multiplexer/demultiplexer according to claim 1,
   wherein to vertical diffraction grating is formed by plating member at one side of the substrate, a plurality of positioning grooves are formed by plating member on the substrate, and each of the fibers is positioned with respect to the vertical diffraction grating by disposing each of the fibers in each of the positioning grooves.

3. An optical multiplexer/demultiplexer according to claim 1,
wherein the vertical diffraction grating is formed by etching the substrate at one side of substrate, a plurality of positioning grooves are formed on the substrate by etching a part of the substrate, and each of the fibers is positioned with respect to the vertical diffraction grating by disposing each of the fibers in each of the positioning groove.

4. An optical multiplexer/demultiplexer according to claim 1,
wherein the substrate comprises an Si substrate, faces on which the vertical diffraction grating and positioning means of the Si substrate are formed are set to a (100) face or a (110) face of the Si substrate.

5. An optical multiplexer/demultiplexer according to claim 1,
wherein a light reflective film is formed on a surface of the vertical diffraction grating.

6. An optical multiplexer/demultiplexer according to claim 1,
wherein the lens member is a lens array which comprises a plurality of lens main bodies positioned with respect to a plurality of the fibers.

7. An optical multiplexer/demultiplexer according to claim 1,
wherein fixing means for the lens member is formed integrally on the substrate between the fiber and the vertical diffraction grating.

8. An optical multiplexing/demultiplexing module comprising:
a vertical diffraction grating which is formed at one side of a substrate integrated with the substrate, wherein
one pair or more of fibers through which light goes from the vertical diffraction grating or light comes into the vertical diffraction grating are disposed on the substrate, a lens member is disposed between the fiber and the vertical diffraction grating, positioning means which positions a plurality of the diffraction grating is formed on the substrate integrated with the substrate, a space between the vertical diffraction grating and the fibers constitutes a waveguide, a casing covers the substrate, the vertical diffraction grating, the positioning means for the fiber, the lens member, and the waveguide, a fiber joint part is formed at an end part of the fiber lead-out from the casing, and
a plurality of positioning grooves are formed on the substrate by plating or etching a part of the substrate, and each of the fibers is placed with respect to the vertical diffraction grating by disposing each of the fibers in each of the positioning groove.

9. A method of manufacturing an optical multiplexer/demultiplexer comprising:
forming a vertical diffraction grating at one side of a substrate integrated with the substrate, wherein
one pair or more of fibers through which light goes out from the vertical diffraction grating or light comes into the vertical diffraction grating are disposed on the substrate, a lens member is disposed between the fiber and the vertical diffraction grating, positioning means which positions a plurality of the diffraction grating is formed on the substrate integrated with the substrate, and a space between the vertical diffraction grating and the fibers constitutes a waveguide,
wherein resist is applied to the substrate on which at least a surface thereof is made conductive, the resist is exposed and developed to form a pattern for forming the vertical diffraction grating, a pattern forming the fiber-positioning member, and a pattern for the lens member attaching part, and then plating processing is applied to the substrate to form the vertical diffraction grating, the lens member attaching part, and the fiber-positioning member, which are made of plating member, along each of the patterns on the substrate,
wherein the vertical diffraction grating, the lens member attaching part, and the fiber-positioning member are formed by a single photolithography process, and
wherein a plurality of positioning grooves are formed on the substrate by plating or etching a part of the substrate, and each of the fibers is placed with respect to the vertical diffraction grating by disposing each of the fibers in each of the positioning groove.

10. A method of manufacturing an optical multiplexer/demultiplexer comprising:
forming a vertical diffraction grating at one side of a substrate integrated with the substrate, wherein
one pair or more of fibers through which light goes from the vertical diffraction grating or light comes into the vertical diffraction grating are disposed on the substrate, a lens member is disposed between the fiber and the vertical diffraction grating, positioning means which positions a plurality of the diffraction grating is formed on the substrate integrated with the substrate, and a space between the vertical diffraction grating and the fibers constitutes a waveguide,
wherein resist is applied to the substrate, the resist is exposed and developed to form a pattern for forming the vertical diffraction grating, a pattern forming the fiber-positioning member, and a pattern for the lens member attaching part, and then a surface of the substrate is etched through the pattern to form the vertical diffraction grating, the lens member attaching part, and the fiber-positioning member along each of the patterns on the substrate,
wherein the vertical diffraction grating, the lens member attaching part, and the fiber-positioning member are formed by a single photolithography process, and
wherein a plurality of positioning grooves are formed on the substrate by plating or etching a part of the substrate, and each of the fibers is placed with respect to the vertical diffraction grating by disposing each of the fibers in each of the positioning groove.

11. A method of manufacturing an optical multiplexer/demultiplexer comprising:
forming a vertical diffraction grating at one side of a substrate integrated with the substrate; wherein
one pair or more of fibers through which light goes from the vertical diffraction grating or light comes into the vertical diffraction grating are disposed on the substrate, a lens member is disposed between the fiber and the vertical diffraction grating, positioning means which positions a plurality of the diffraction grating is formed on the substrate integrated with the substrate, and a space between the vertical diffraction grating and the fibers constitutes a waveguide,
wherein resist is applied to the substrate on which at least a surface thereof is made conductive, the resist is exposed and developed to form a pattern for forming the vertical diffraction grating, then plating processing is applied to the substrate to form the vertical diffraction grating which is made of plating member along the pattern on the substrate, wherein resist is applied to the substrate, the resist is exposed and developed to form a pattern for forming the fiber-positioning member, and then the substrate surface is etched through the pattern, and the fiber-positioning member is formed by etching along the pattern on the substrate, wherein the vertical diffraction grating, the lens member attaching part, and the fiber-positioning member are formed by signal photolithography process, and wherein a plurality of positioning grooves are formed on the substrate by plating or etching a part of the substrate, and each of the fibers is placed with respect to the vertical diffraction grating by disposing each of the fibers in each of the positioning groove.

12. A method of manufacturing an optical multiplexer/demultiplexer comprising:

forming a vertical diffraction grating at one side of a substrate integrated with the substrate, wherein one pair or more of fibers through which light goes from the vertical diffraction grating or light comes into the vertical diffraction grating are disposed on the substrate, a lens member is disposed between the fiber and the vertical diffraction grating, positioning means which positions a plurality of the diffraction grating is formed on the substrate integrated with the substrate, and a space between the vertical diffraction grating and the fibers constitutes a waveguide, wherein resist is applied to the substrate, the resist is exposed and developed to form a pattern for forming the vertical diffraction grating, then the substrate surface is etched through the pattern, then the vertical diffraction grating is formed by etching along the pattern on the substrate, wherein resist is applied to the substrate on which at least a surface thereof is made conductive, the resist is exposed and developed to form a pattern for forming the fiber-positioning member along each of the patterns on the substrate, and then plating processing is applied to the substrate to form the fiber-positioning member, which is made of plating member, along the pattern on the substrate, wherein the vertical diffraction grating, the lens member attaching part, and the fiber-positioning member are formed by p single photolithography process, and wherein a plurality of positioning grooves are formed on the substrate by plating or etching a part of the substrate, and each of the fibers is placed with respect to the vertical diffraction grating by disposing each of the fibers in each of the positioning groove.

* * * * *